(12) United States Patent
Dann et al.

(10) Patent No.: US 12,182,095 B2
(45) Date of Patent: Dec. 31, 2024

(54) PARSING JSON ON FIELD PROGRAMMABLE GATE ARRAYS

(71) Applicant: SAP SE, Walldorf (DE)

(72) Inventors: Jonas Dann, Heidelberg (DE); Royden Wagner, Bruchsal (DE); Daniel Ritter, Heidelberg (DE)

(73) Assignee: SAP SE, Walldorf (DE)

( * ) Notice: Subject to any disclaimer, the term of this patent is extended or adjusted under 35 U.S.C. 154(b) by 65 days.

(21) Appl. No.: 18/053,505

(22) Filed: Nov. 8, 2022

(65) Prior Publication Data

US 2023/0401194 A1 Dec. 14, 2023

Related U.S. Application Data

(60) Provisional application No. 63/350,322, filed on Jun. 8, 2022.

(51) Int. Cl.
*G06F 16/23* (2019.01)

(52) U.S. Cl.
CPC .................. *G06F 16/235* (2019.01)

(58) Field of Classification Search
CPC ............... G06F 16/235; G06F 16/84
See application file for complete search history.

(56) References Cited

U.S. PATENT DOCUMENTS

| | | | |
|---|---|---|---|
| 2015/0378674 A1* | 12/2015 | Ruff | H03M 7/06 708/204 |
| 2017/0099332 A1* | 4/2017 | Bullotta | H04L 67/02 |
| 2019/0123928 A1* | 4/2019 | Aston | H04L 12/185 |
| 2020/0293609 A1* | 9/2020 | Irigoyen | G06F 40/169 |
| 2020/0304240 A1* | 9/2020 | Fu | H04L 69/16 |
| 2020/0341970 A1* | 10/2020 | Rodrigues | H04L 51/02 |
| 2022/0239557 A1* | 7/2022 | Gopalakrishnan | H04L 41/08 |

OTHER PUBLICATIONS

Langdale, Parsing gigabytes of JSON per second, pp. 941-960 (Year: 2019).*

Peltenburg, Tens of gigabytes per second JSON-to-Arrow conversion with FPGA accelerators, pp. 1-9 (Year: 2021).*

(Continued)

*Primary Examiner* — Albert M Phillips, III
(74) *Attorney, Agent, or Firm* — Mintz Levin Cohn Ferris Glovsky and Popeo, P.C.

(57) ABSTRACT

A method may include parsing, using a JavaScript Object Notation (JSON) parser implemented on a field programmable gate array (FPGA), a JSON document. The parsing includes dividing an input string comprising the JSON document into one or more data blocks and annotating the characters included in each data block a bitmap for each data block. String characters included in the data blocks may be identified, based on the bitmap associated with each data block, for writing to a string array. Numeric characters included in the data blocks may be transformed, based on the bitmap associated with each data block, into integers value for writing to an integer array or float values for writing to a float array. A tape including a binary representation of the JSON document may be generated based on the bitmap associated with each data block. Related systems and computer program products are also provided.

20 Claims, 14 Drawing Sheets

(56) References Cited

OTHER PUBLICATIONS

Abiteboul. S. et al., "Research Directions for Principles of Data Management," Dagstuhl Perspectives Workshop 16151, Dagstuhl Afanifestos 7, 1 (2018). 1-29.
Austin, C. et al. 2012. sajson. https://github.com/chadaustin/sajson, Accessed: Mar. 2022.
Bray, T. et al., "The Javascript Object Notation (JSON) Data Interchange Format," (2014).
Cameron, R.D. et al., "High Performance XML Parsing Using Parallel Bit Stream Technology," (2008).
Dai, Z. et al., "A 1 Cycle-per-Byte XML Parsing Accelerator," (2010).
Dann, J. et al., "Demystifying Memory Access Patterns of FPGA-based Graph Processing Accelerators," In Grades-NDA. ACM, 3:1-3:10.
Dann, J. et al., "Non-Relational Databases on FPGAs: Survey, Design Decisions, Challenges," arXiv:2007.07595 (2020).
Durner, D. et al., "JSON Tiles: Fast Analytics on Semi-Structured Data," In SIGMOD. ACM, (2021).
Huang, L. et al., "A Slide-Window-Based Hardware XML Parsing Accelerator," In CCF National Conference on Computer Engineering and Technology. Springer, 108-117.
Jiang, L. et al., "Scalable Structural Index Construction for JSON Analytics," VLDB 14, 4 (2020), 694-707.
Li, Y. et al., "Mison: A Fast JSON Parser for Data Analytics," PVLDB 10, 10 (2017), 1118-1129.
Nicola, M. et al., "XML Parsing: A Threat to Database Performance," In CIKM. ACM, 175-178.
Palkar, S. et al., "Filter Before You Parse: Faster Analytics on Raw Data with Sparser," PVLDB 11, 11 (2018), 1576-1589.
Reinders, J. et al., "Data Parallel C++: Mastering DPC++ for Programming of Heterogeneous Systems Using C++ and SYCL,". Springer Nature.
Sidhu, R. "High Throughput, Tree Automata based XML Processing Using FPGAs," In FPT. IEEE, 74-81.
Thomas, J.J. et al., "Fleet: A Framework for Massively Parallel Streaming on FPGAs," In ASPLOS. ACM, 639-651.
Yip, M. et al. "RapidJSON," https://rapidjson.org, Accessed: Mar. 2022.

* cited by examiner

FIG. 4

PARSING JSON ON FIELD PROGRAMMABLE GATE ARRAYS

CROSS REFERENCE TO RELATED APPLICATION

This application claims priority to U.S. Provisional Application No. 63/350,322, entitled "PARSING JSON ON FIELD PROGRAMMABLE GATE ARRAYS" and filed on Jun. 8, 2022, the disclosure of which is incorporated herein by reference in its entirety.

TECHNICAL FIELD

The subject matter described herein relates generally to parsing JavaScript Object Notation (JSON) and more specifically to a JSON parser implemented on field programmable gate arrays (FPGAs).

BACKGROUND

JavaScript Object Notation (JSON) is an independent data exchange and storage format that has become a popular alternative to Extensible Markup Language (XML). JSON is a subset of the JavaScript programming language that uses two structures, an ordered list of values known as an array and a collection of name and value pairs known as an object, to represent a document. A JSON parser may transform a JSON document from a raw string into a binary representation that can be easily used by an application.

SUMMARY

Methods, systems, and articles of manufacture, including computer program products, are provided for parsing JavaScript Object Notation (JSON) on field programmable gate arrays (FPGAs). In one aspect, there is provided a system including a JavaScript Object Notation (JSON) parser implemented on a field programmable gate array. The JSON parser may be configured to perform operations that include: dividing, by an input reader of the JSON parser, an input string comprising a JSON document into one or more data blocks; annotating, by a tokenizer of the JSON parser, a plurality of characters included in each data block of the one or more data blocks to generate, for each data block of the one or more data blocks, a corresponding bitmap; identifying, by a string filter of the JSON parser and based on the bitmap associated with each data block of the one or more data blocks, one or more string characters within the plurality of characters included in the data block for writing to a string array; transforming, by a number parser of the JSON parser and based on the bitmap associated with each data block of the one or more data blocks, one or more numeric characters within the plurality of characters included in the data block, the one or more numeric characters being transformed into an integer value for writing to an integer array or a float value for writing to a float array; and generating, by a tape builder of the JSON parser and based on the bitmap associated with each data block of the one or more data blocks, a tape comprising a binary representation of the JSON document.

In another aspect, there is provided a method for parsing JavaScript Object Notation (JSON) on field programmable gate arrays (FPGAs). The method may include: dividing, by an input reader of a JavaScript Object Notation (JSON) parser implemented on a field programmable gate array (FPGA), an input string comprising a JSON document into one or more data blocks; annotating, by a tokenizer of the JSON parser, a plurality of characters included in each data block of the one or more data blocks to generate, for each data block of the one or more data blocks, a corresponding bitmap; identifying, by a string filter of the JSON parser and based on the bitmap associated with each data block of the one or more data blocks, one or more string characters within the plurality of characters included in the data block for writing to a string array; transforming, by a number parser of the JSON parser and based on the bitmap associated with each data block of the one or more data blocks, one or more numeric characters within the plurality of characters included in the data block, the one or more numeric characters being transformed into an integer value for writing to an integer array or a float value for writing to a float array; and generating, by a tape builder of the JSON parser and based on the bitmap associated with each data block of the one or more data blocks, a tape comprising a binary representation of the JSON document.

In some variations of the methods and systems, one or more of the following features can optionally be included in any feasible combination.

In some variations, each of the input reader, the tokenizer, the string filter, the number parser, and the tape builder may form a pipeline on the field programmable gate array (FPGA).

In some variations, the JSON parser may be communicatively coupled, via a peripheral component interconnect express (PCIe), with a parser stub on a host central processing unit (CPU) with host code for one or more applications ingesting the binary representation of the JSON document.

In some variations, the JSON parser may be deployed on a first device while one or more applications ingesting the binary representation of the JSON document is hosted on a second device.

In some variations, the tokenizer may be further configured to append a first bit to an end of a first bitmap of a first data block and a last bit of the first bitmap and a second bit to a start of a second bitmap of a second data block following the first block. The first bit and the second bit may identify an overflow type associated with a single JSON value spanning the first data block and the second data block.

In some variations, the overflow type may be a string, a backslash, a number, or none.

In some variations, the tokenizer may be configured to compute, for all overflow types, a corresponding bitmap in parallel, and wherein one or more bitmaps passed onto the string filter and/or the number parser are identified by a multiplexer based on a known overflow type from a previous data block.

In some variations, the string filter may operate on a quoted range (QR) bitmap, and a quoted range end (QRE) bitmap, and a corresponding block of characters.

In some variations, the string filter may be configured to compact one or more string characters within a data block into a single contiguous sequence while tracking a quantity of characters, a quantity of different strings, and a length of each individual string.

In some variations, the number parser may operate on a number range (NR) bitmap, a number range end (NRE) bitmap, a floating point decimal part (FDP) bitmap, and a corresponding block of characters.

In some variations, the number parser may be configured to process one input character in each pipeline step while updating an internal counter tracking a current number being parsed.

In some variations, a temporary number pointed to by the internal counter may be multiplied by 10 and added to the current number when the number parser encounters a numerical character. The number parsers may pass on the temporary number when the number parser fails to encounter a numerical character. The internal counter may be incremented when the number parser encounters a number range end indicating that the current number is finished parsing. An auxiliary decimal digit counter may be incremented when the number parser encounters a decimal point.

In some variations, the binary representation of the JSON document may include a plurality of one-byte tokens corresponding to strings, integers, Booleans, null, and/or floating point numbers.

In some variations, the binary representation of the JSON document may include one or more nested objects and array structures, and wherein each nested object or array structure is denoted by a begin token and an end token.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to JavaScript Object Notation (JSON), it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4 depicts a schematic diagram illustrating an example of a tokenizer, in accordance with some example embodiments;

When practical, similar reference numbers denote similar structures, features, or elements.

DETAILED DESCRIPTION

In recent years, JavaScript Object Notation (JSON) and its variants gained popularity as data exchange and storage formats due to their flexible, semi-structured data representation. This is especially important for analytical data processing systems working on massive amounts and a wide variety of data. While these systems process and store data in efficient internal binary formats, ingesting raw JSON documents is expensive due to parsing. Recent advances on modern central processing units (CPUs), such as Mison and its technical successor simdjson, show improvements using data parallelism with vector instructions, when compared to standard libraries like sajson and RapidJSON. Nevertheless, due to a rigid instruction set and limited pipelining of central processing units (CPUs), which restrict parsing performance from reaching the practical limit of memory bandwidth, central processing unit (CPU) based parsers do not achieve optimal JSON parsing performance.

In some example embodiments, a JavaScript Object Notation (JSON) parser may be implemented on field programmable gate arrays (FPGAs) instead of central processing units. The resulting JSON parser, termed PipeJSON in the present disclosure, is the first standard-compliant JSON parser to process tens of gigabytes of data per second, by parsing multiple characters per clock cycle. Instead of data parallel advanced vector extension (AVX) instructions on modern central processing units (CPUs), PipeJSON utilizes field programmable gate array (FPGA) hardware to make extensive use of AVX-equivalent loop unrolling and additional deep pipelining. PipeJSON may include a simdjson-based tokenizer, which may be extended and combined with multiple fully pipelined modules on the field programmable gate array (FPGA). To ensure usability in software projects, PipeJSON is implemented in Data Parallel C++, adapted to software developers and usable in various programming languages (e.g., C++, Go, and/or the like).

Figure 12:
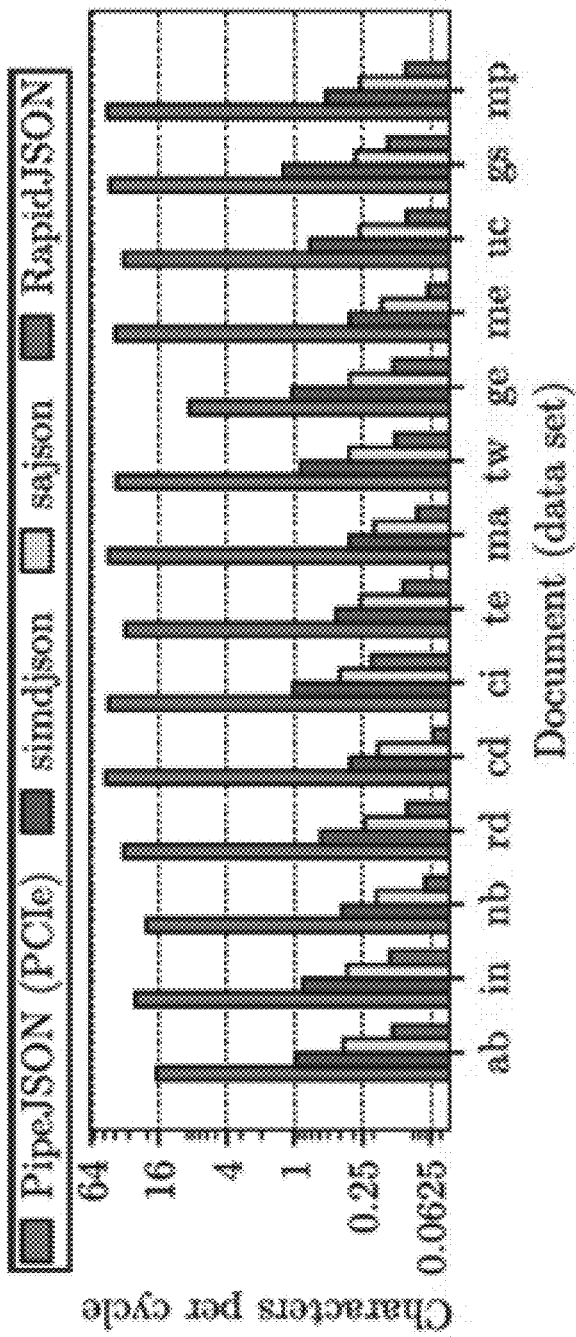
FIG. 12 depicts another performance comparison between a field programmable gate array (FPGA) JavaScript Object Notation (JSON) parser and various central processing unit (CPU) parser, in accordance with some example embodiments.

In some example embodiments, the potential for accelerating JSON parsing afforded by the field programmable gate array may be leveraged by implementing a JSON parser concept with data parallelism matched to the width of the off-chip memory interface. The JSON parser prototype disclosed herein may incorporate a simdjson-compatible interface and is thus capable of acting as a drop-in replacement for central processing unit (CPU) based parsers. As shown in the comparison depicted in FIG. 12, the resulting PipeJSON system achieves 7.95× speedup over state-of-the-art JSON parsers implemented on central processing units (CPUs), including additional data transfer via peripheral component interconnect express (PCIe). Flexible pipelining and data parallelism, achieved by the field programmable gate arrays (FPGAs), is particularly suitable for the task of JSON parsing and is able to overcome performance bottlenecks associated with central processing units (CPUs), particularly those for number parsing.

Figure 1:
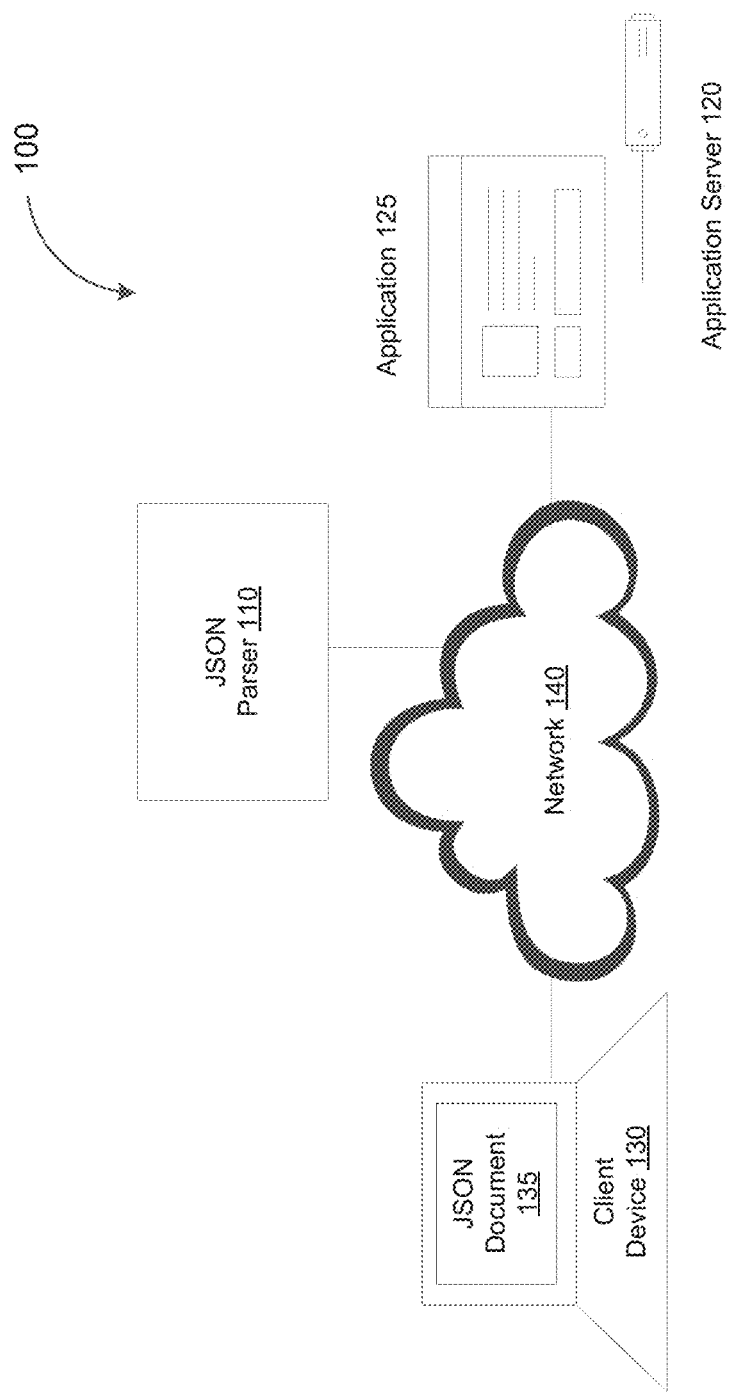
FIG. 1 depicts a system diagram illustrating an example of a cloud computing system, in accordance with some example embodiments.

FIG. 1 depicts a system diagram illustrating an example of a cloud computing system 100, in accordance with some example embodiments. Referring to FIG. 1, the cloud computing system may include a JavaScript Object Notation (JSON) parser 110, an application server 120 hosting one or more applications 125, and a client device 130. As shown in FIG. 1, the JSON parser 110, the application server 120, and client device 130 may be communicatively coupled over a network 140. The client device 130 may be a processor-based device including, for example, a smartphone, a tablet computer, a wearable apparatus, a virtual assistant, an Internet-of-Things (IoT) appliance, and/or the like. The network 140 may be a wired network and/or a wireless network including, for example, a wide area network (WAN), a local area network (LAN), a virtual local area network (VLAN), a public land mobile network (PLMN), the Internet, and/or the like.

The JSON parser 110 may be configured to parse a JSON document 135, for example, from the client device 130. The JSON document 135 may be include data in a JSON format, which is a text-based, language-independent data interchange format. The JSON format can be recursively defined as follows (omitting formal definitions of STRING and NUMBER due to brevity):

TEXT-OBJECT . . . OBJECT
OBJECT-{STRING: VALUE, . . . , STRING: VALUE}
ARRAY-[VALUE, . . . , VALUE]
VALUE-OBJECT|ARRAY|STRING|NUMBER|TRUE|FALSE|NULL

A JSON text is a sequence of zero or more JSON objects or arrays. A JSON object is enclosed in braces (e.g., "{" and "}"), and contains a sequence of zero or more key-value pairs. A key-value pair is a field of an object, for which each key is followed by a single colon (e.g., ":") separating the key from its corresponding value. An array is an ordered collection of values, and is represented as brackets (e.g., "[" and "]") surrounding zero or more values, separated by commas. A value can be a string in quotes (e.g., " " "), a number, true or false, null, an object, or an array. Accordingly, the aforementioned structures can be nested to form, for example, the JSON document 135.

The JSON parser 110 may parse the JSON document 135 by at least transforming the JSON document 135 from a raw string into a binary representation such that the JSON document 135 may be used by the one or more applications 125 at the application server 120. For example, the raw string may include a sequence of alphanumeric characters encoded, for example, in Unicode, American Standard Code for Information Interchange (ASCII), and/or the like. Transforming the JSON document 135 into a corresponding binary representation may enable the one or more applications 125 to traverse the JSON document 135 and quickly access and operate on the various values contained therein. In particular, parsing the JSON document 135 may include, among other things, building an easily traversable token representation of the nested objects and arrays included in the JSON document 135, and transforming the textual representations of numerical characters (e.g., encoded in Unicode, American Standard Code for Information Interchange (ASCII), and/or the like) included therein into integer values and/or floating point values.

Figure 2:
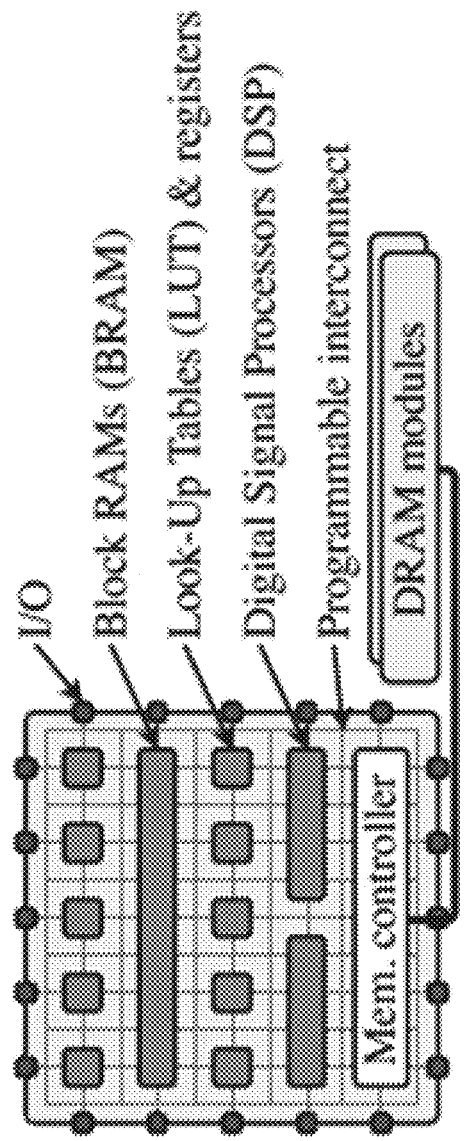
FIG. 2 depicts a schematic diagram illustrating an example of an field programmable gate array (FPGA) architecture, in accordance with some example embodiments.

In some example embodiments, the JSON parser 110 may be the field programmable gate array (FPGA) based JSON parser PipeJSON, which affords superior parsing performance (e.g., characters per clock cycle) than JSON parsers implemented on central processing units (CPUs). To further illustrate, FIG. 2 depicts a schematic diagram illustrating an example of a field programmable gate array (FPGA) architecture, in accordance with some example embodiments. As shown in FIG. 2, field programmable gate array (FPGA) chips map custom digital circuit designs (a set of logic gates and their connections) to a grid of resources (e.g., lookup tables, registers, and/or the like) connected with a programmable interconnection network. For frequently used complex functionality like floating point computation, field programmable gate arrays (FPGAs) contain digital signal processors (DSPs). Access to off-chip resources such as dynamic random access memory (DRAM) and network controllers is possible over I/O pins. The memory hierarchy of field programmable gate arrays (FPGAs) is split up into on-chip and off-chip memory. On-chip, field programmable gate arrays implement distributed memory, that is made up of single registers and is mostly used as storage for working values, and block random access memory (BRAM) in the form of static random access memory (SRAM) components for fast storage of data structures. On modern field programmable gate arrays, there may be as much block random access memory as there is cache on central processing units (all cache levels combined), but contrary to the fixed cache hierarchies of central processing units, block random access memory (BRAM) is finely configurable to the given application.

Due to the relevance of semi-structured data, many central processing unit (CPU) based JSON parsers such as RapidJ- SON and sajson have been proposed. Through advances in modern central process units (CPUs), improved central processing unit based JSON parsers like Mison and simdjson are able to leverage advanced vector extension (AVX) instructions for data parallel single instruction multiple data (SIMD) processing. Table 1 below provides a comparison between various central processing unit (CPU) based JSON parsers and the field programmable gate array (FPGA) based JSON parser PipeJSON. Compared to other field programmable gate array (FPGA) based parsers, PipeJSON is able to parse any document without a separate parser generation step. As such, PipeJSON is applicable to any JSON document and will incur a constant resource utilization independent of document templates. PipeJSON implements data parallel concepts and is the first general-purpose, validating (e.g., structural correctness) field programmable gate array (FPGA) based JSON parser to combine line-rate performance with the flexibility of not requiring separate parser generation.

TABLE 1

| Identifier | Platform | Validating | Data parallel |
|---|---|---|---|
| Mison [12] | CPU | ♡ | 👍 |
| simdjson [11] | CPU | 👍 | 👍 |
| sajson [2] | CPU | 👍 | ♡ |
| RapidJSON [19] | CPU | 👍 | ♡ |
| PipeJSON | FPGA | ◊ | 👍 |

Supported 👍 : yes, ◊ : partially, ♡ : no

Figure 3:
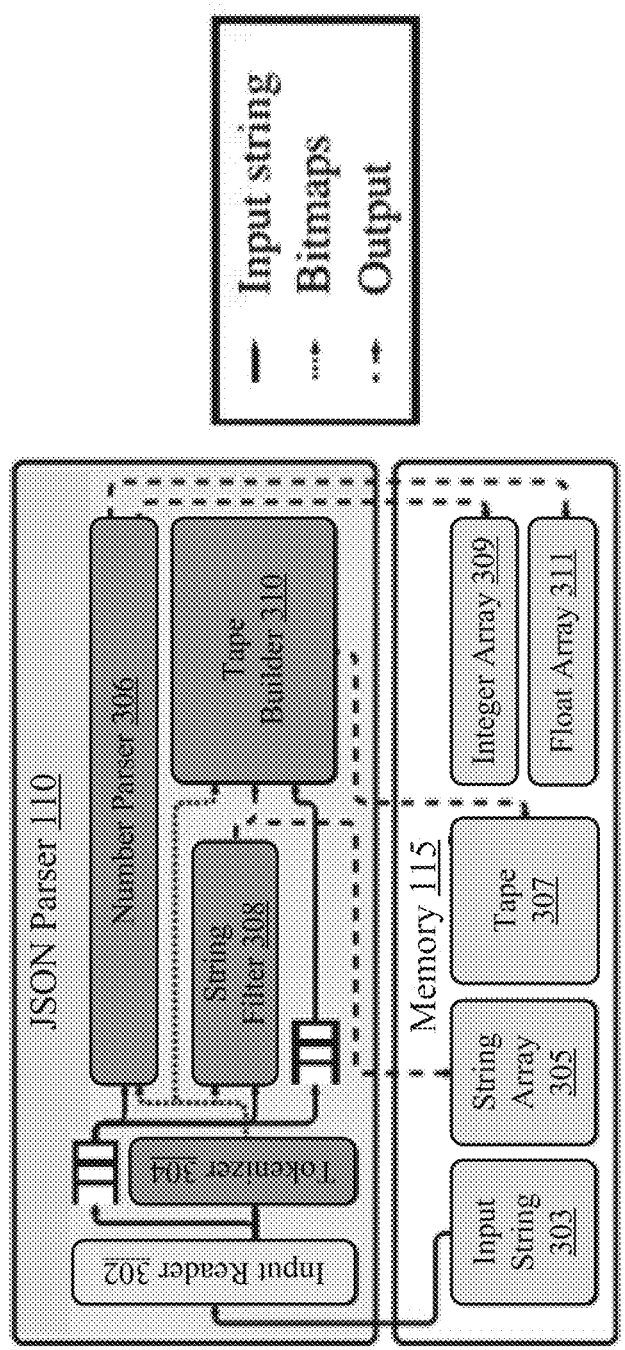
FIG. 3 depicts a block diagram illustrating an example of a JavaScript Object Notation (JSON) parser, in accordance with some example embodiments.

FIG. 3 depicts a block diagram illustrating an example of the JavaScript Object Notation (JSON) parser 110, in accordance with some example embodiments. As noted, the JSON parser 110 may be configured to be implemented on field programmable gate arrays (FPGAs). Moreover, as shown in FIG. 3, the JSON parser 110 may include an input reader 302, a tokenizer 304, a number parser 306, a string filter 308, and a tape builder 310, each of which being a pipeline on a field programmable gate array (FPGA). As will be discussed in more detail, the performance of the JSON parser 110 prototype may be compared to those of other central processing unit (CPU) based parsers.

As noted, each of the input reader 302, the tokenizer 304, the number parser 306, the string filter 308, and the tape builder 310 may be a pipeline on a field programmable gate array (FPGA). Each operation in the processes of each pipeline may process different data in parallel. In addition to building deep pipelines, the flexibility of the field programmable gate array may be leveraged by adding data parallelism where state-of-the-art central process unit (CPU) based parser architectures cannot use single instruction multiple data (SIMD) processing to solve a problem in a data parallel fashion (e.g., string filtering and number parsing). A raw JSON document, such as the JSON document 135, may be read as an input string 303 from a memory 115 associated with the JSON parser 110 and the corresponding output may be written back in the form of a binary representation as a combination of a tape 307 with JSON tokens, a string array 305, an integer array 309 (e.g., for integer values), and a float array 311 (e.g., for float point numbers). While the output could be written in any format, a simdjson based representation may be used in order to provide comparable results for subsequent performance evaluation.

In some example embodiments, the input reader 302 may read the input string 303 and divide the input string 303 into one or more fixed sized blocks whose size match the cache line width of the memory channel found in the dynamic random access memory (DRAM) associated with the field programmable gate array (FPGA) implementing the JSON parser 110. For example, in some cases, the input reader 302 may split the input string 303 into 64 character large blocks in order to match the cache line width of a 64-byte single memory channel found in current dynamic random access memory (DRAM) technology. The input reader 302 may pass each data block to the tokenizer 304 and a queue (e.g., a first-in-first-out (FIFO) queue for on-chip memory and logic) for subsequent processing. The tokenizer 304 may annotate the characters in each block with bitmaps for further processing, for example, by datatype-specific components of the JSON parser 110. For example, based on the bitmaps and the data blocks from the queue, the string filter 308 may select and write all string characters to the string array 305 and pass the quantity of strings in each block and the corresponding lengths to the tape builder 310. The tape builder 310 may read the input characters, bitmaps, and information from the string filter 308, and write one or more corresponding tokens to the tape 307 in memory 115. Meanwhile, the number parser 306 may read from the queue and receive bitmaps from the tokenizer 304 before transforming numeric characters into either integer values or float values. The number parser 306 may then write integer values to the integer array 309 in the memory 115 and float values to the float array 311 in the memory 115.

Figure 4:
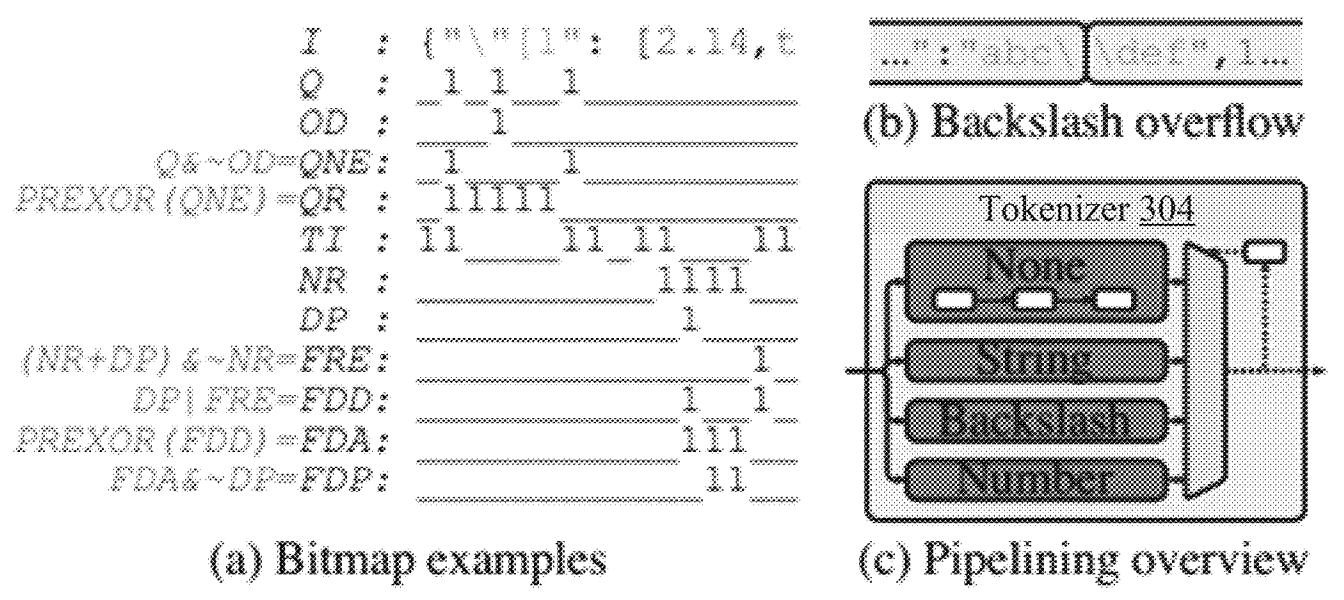

To further illustrate, FIG. 4 depicts a schematic diagram illustrating an example of the tokenizer 304, in accordance with some example embodiments. In some example embodiments, the tokenizer 304 may compute the bitmaps from a given raw JSON input string block generated, for example, by the input reader 302 dividing the input string 303 into one or more blocks whose size match the cache line width of the memory channel found in the dynamic random access memory (DRAM) associated with the field programmable gate array (FPGA) implementing the JSON parser 110. FIG. 4(a) shows a subset of the bitmap computation done in the tokenizer 304. In this simplified example, I denotes the input string 303 while Q denotes the quotes, OD denotes the ends of odd sequences of backslashes, TI denotes the tokens, NR denotes the number characters, and DP denotes the decimal points included in the input string 303.

To attain the main bitmap used for string filtering (e.g., quoted ranges QR), the escaped quotes are removed from Q with bitmap OD and a prefix exclusive-or is applied to the resulting QNE. The token bitmap TI is used by the tape builder 310 to write tokens to the tape 307 in the memory 115. The NR bitmap and the FDP bitmap marking the decimal digits of floating point numbers are used primarily by the number parser 306. The latter may be computed by first adding DP to the NR bitmap and only taking the non NR bits, resulting in the float ends FPE. To get FDP, the prefix exclusive-or operator may be applied again on the ranges delimited by DP and FPE (e.g., FDD) before removing the decimal point again from the resulting FDA bitmap.

Because the input string 303 is split up into fixed sized blocks by the input reader 302, FIG. 4(b) shows that a single JSON value like a string may become a part of multiple blocks. A variety of overflow types, including (i) String, (ii) Backslash, (iii) Number, and (iv) None are introduced to accommodate the changes in tokenization behavior. For example, if the last character of the current block was in a string, escaped by a backslash (as in the example shown in FIG. 4(b)), part of a number, or neither, a respective overflow type may be used as the context for the next block. This may be implemented by appending one bit at the end of the bitmaps to capture overflows and by pre-pending the last bit and the overflow bit from the end of the previous block to pass this information. For simplicity, overflow types derived from the number overflow type for negative numbers, the decimal part of a number, and the decimal part of a negative number (not shown) are reused.

FIG. 4(c) depicts an abstract view of the tokenizer 304. The components of the tokenizer 304 may be pipelined for better throughput but would have to wait until the overflow type is known. Since the bitmap computation for a block would have to wait for the previous block to appear in the pipeline, this may degrade performance. To circumvent this, the bitmaps for all overflow types may be precomputed in parallel. The decision on which bitmaps to pass on may be made with a multiplexer based on the then known overflow type from the previous block.

Figure 5:
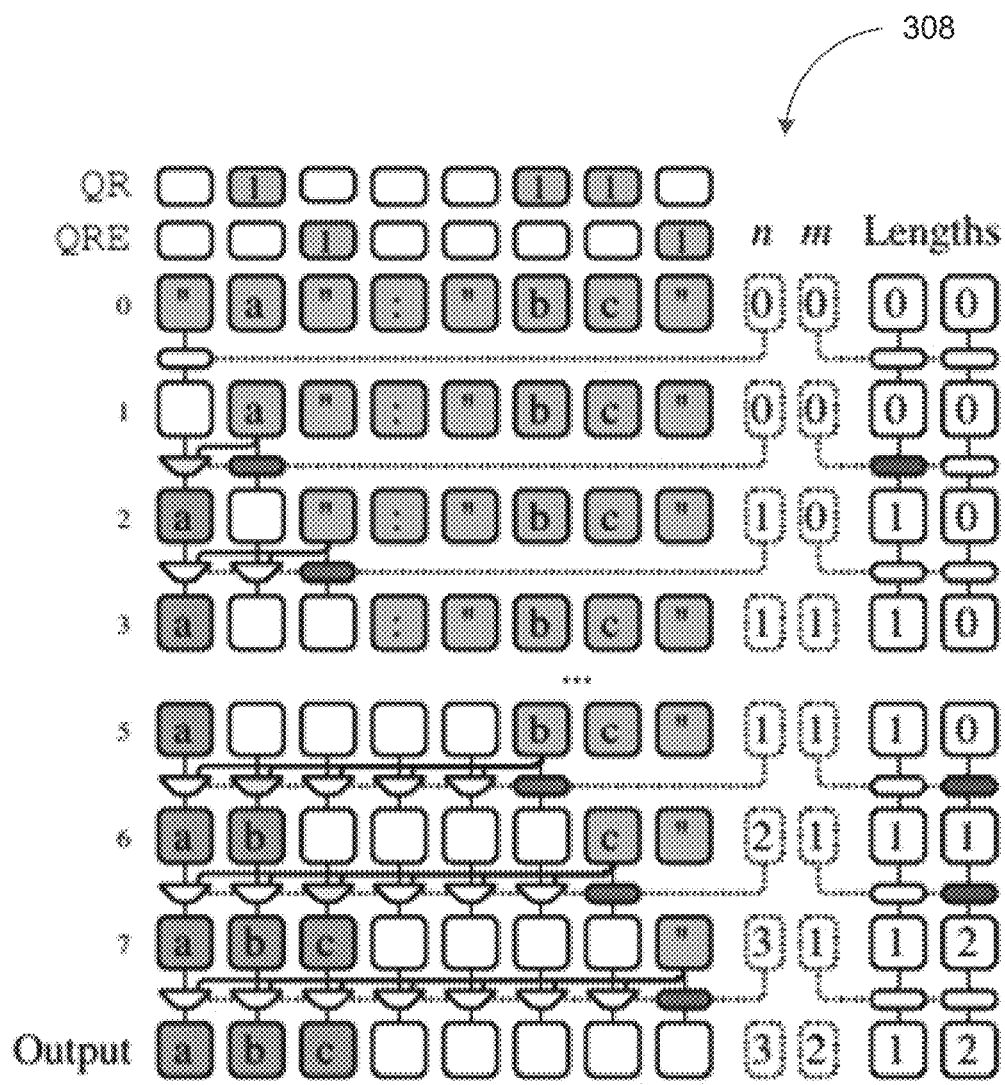
FIG. 5 depicts a schematic diagram illustrating an example of a string filter, in accordance with some example embodiments.

FIG. 5 depicts a schematic diagram illustrating an example of the string filter 308, in accordance with some example embodiments. As input, the string filter 308 takes the quoted range (QR) bitmap and quoted range end (QRE) bitmap and a block of characters. For brevity, FIG. 5 shows an 8-character string filter. During processing, the string filter 308 may compact the string characters within a block into one contiguous sequence while keeping track of the number of total characters, number of different strings, and the length of each individual string. A throughput of one block of size b per clock cycle may be achieved by having b pipeline steps each consuming one input character and extending the output sequence by one output character. For each step i, the string filter 308 may include an i quantity of multiplexers either forwarding the output character from step i-1 or forwarding the currently to-be-consumed character for multiplexer n if it is a string character. In case of a string character (operations 1, 5, and 6), the string filter 308 may increment the current string length pointed to by m. Whenever the string filter 308 encounters a quoted range end (operations 2 and 7), the string filter 308 may increment m.

Figure 6:
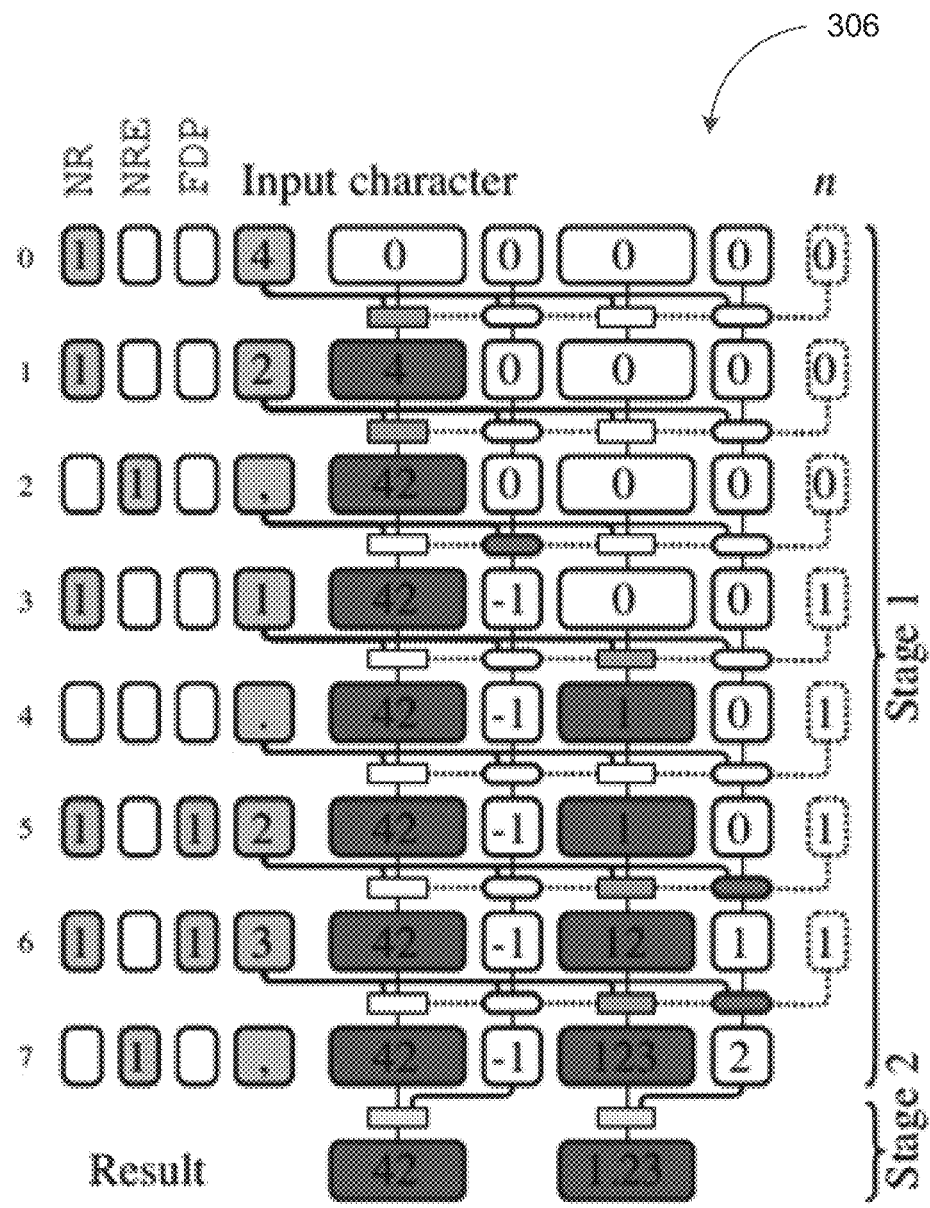
FIG. 6 depicts a schematic diagram illustrating an example of a number parser, in accordance with some example embodiments.
Figure 7:
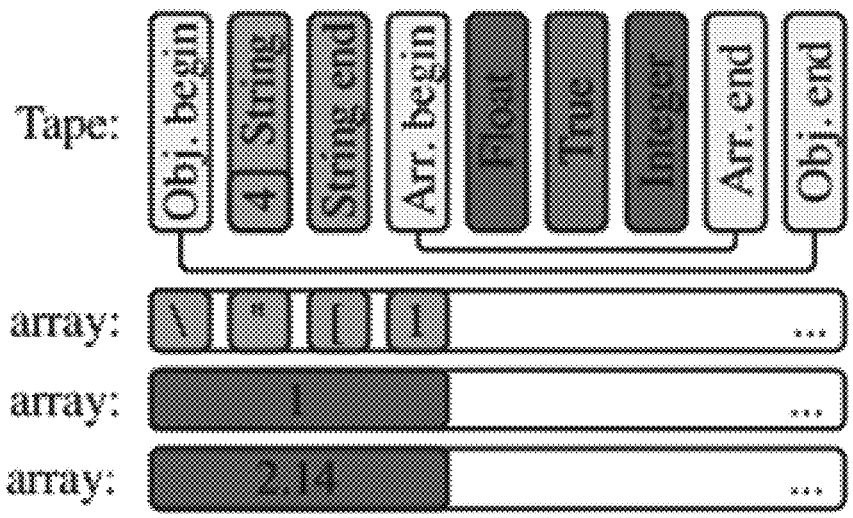
FIG. 7 depicts a schematic diagram illustrating an example of a binary data representation output by a JavaScript Object Notation (JSON) parser, in accordance with some example embodiments.

FIG. 6 depicts a schematic diagram illustrating an example of the number parser 306, in accordance with some example embodiments. In some example embodiments, the number parser 306 may be implemented as the two-staged number parser pipeline shown in FIG. 6. In the first stage, the number parser 306 may ingest the input characters and bitmap information, such as a number range (NR) bitmap, a number range end (NRE) bitmap, and a floating point decimal part (FDP) bitmap before transforming them into integers. The number parser 306 may be implemented as a pipeline that processes one input character of a block (e.g., a 64 character block) with each operation within the pipeline. Moreover, the pipeline may be associated with an internal counter n to keep track of the current number being parsed. When a numerical character is encountered (e.g., operation 0), the temporary number currently pointed to by n is multiplied by 10 (e.g., shift) and added to the new number character. The resulting updated temporary number is passed to the next pipeline operation. If no numerical character is encountered, the old temporary value is passed on. If a number range end is encountered (operation 2 and 7), n may be incremented because the number is finished parsing. After a decimal point was encountered, for each number character, an auxiliary decimal digit counter is incremented (operation 5 and 6). In the JSON parser 110, this pipeline may be at least 75 steps deep to also account for possible number overflows where characters from the previous block are pre-appended. In a second stage, numbers with a decimal point are multiplied by $10^{-d}$ (e.g., shift) where d denotes the number of decimal digits to transform them into float values. The results may be written to the integer array 309 and the float array 311, respectively.

For comparison reasons, the binary representation generated by the JSON parser 110 may be simdjson-based. Accordingly, the tape 307 may contain a sequence of one-byte tokens as well as nested objects and array structures denoted by a begin token and an end token. There are tokens for strings, integers, Boolean, null (not shown), and floating point numbers. One or more of the least significant bits (e.g., six (or a different number) of the least significant bits) of a string token are used to store the length of the string. Long and overflowing strings are stored as a series of string tokens, each with a maximum length (e.g., 64 bits and/or the like), and a delimiting string end token. The characters of the string itself are stored in the string array 305, by omitting tokens for commas and colons because they can be derived from the context of being in an object or array.

Figure 8:
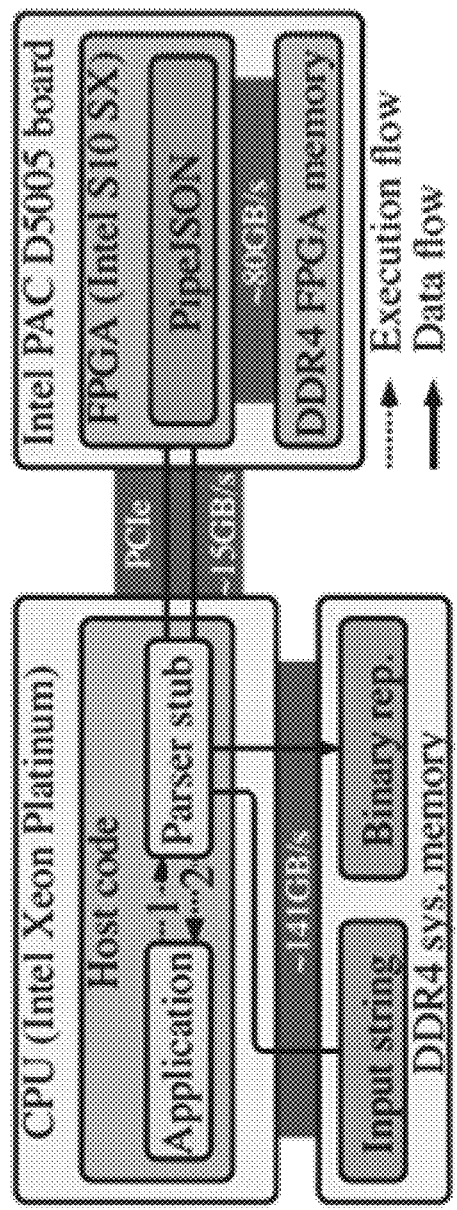
FIG. 8 depicts a block diagram illustrating an example of a parser system architecture, in accordance with some example embodiments.

FIG. 8 depicts a block diagram illustrating the architecture of a prototype of the JSON parser 110, in accordance with some example embodiments. As shown in FIG. 8, the JSON parser 110 may be implemented in Intel oneAPI with Data Parallel C++ as a parser stub on the host central processing unit (CPU) that is just used to communicate with the field programmable gate array (FPGA) and JSON parser 110 on a peripheral component interconnect express (PCIe) field programmable gate array (FPGA). With this configuration, an application, such as the one or more applications 125, may directly call the application programming interface (API) of the parser stub, forwarding the input string 303. The parser stub triggers the JSON parser 110, which directly accesses the input string 303 through the peripheral component interconnect express (PCIe) and returns the resulting binary representation. The result can then be passed back to the calling application (e.g., the one or more applications 125) without any buffer copying or unnecessary detour through field programmable gate array (FPGA) memory. These features render the JSON parser 110 suitable as a drop-in replacement for existing central processing unit (CPU) based JSON parsers, which are peripheral component interconnect express (PCIe) bandwidth-bound. Hence, the JSON parser 110 may also be benchmarked, where the input string 303 is placed on the field programmable gate array (FPGA) memory beforehand and the binary representation is written to field programmable gate array (FPGA) memory only. This set up may be used to show the potential of the JSON parser 110 but may not be as conveniently usable as the JSON parser 110 with a peripheral component interconnect express (PCIe) configuration. Alternatively, a field programmable gate array (FPGA) on-board, device-to-device (D2D) variant of the JSON parser 110 may include the JSON parser 110 being deployed on a separate device as that hosting the one or more applications 125 ingesting the parsed JSON documents output by the JSON parser 110.

In some example embodiments, the JSON parser 110 may be evaluated as a drop-in replacement (e.g., via a peripheral component interconnect express (PCIe)) and field programmable gate array (FPGA) on-board, device-to-device (D2D) variants on different JSON data sets, related to other central processing unit (CPU) based JSON parsers. The evaluations are performed using the prototype shown in FIG. 8, integrated with a server equipped with two Intel Xeon Platinum 8260 CPUs at 2.40 GHz and 377 GB of DDR4-2933 memory. The server also features an Intel programmable acceleration card (PAC) D5005 board attached via PCIe v3 x16. The D5005 contains one Intel Stratix 10 SX 2800 FPGA with 933,120 adaptive logic modules as the basic logic building blocks, 3,732,480 registers, 30.5 MB of BRAM, and 5,760 DSP blocks. Intel oneAPI 2022.1 was used with the standard board support package and Quartus 19.2 for synthesis of the field programmable gate array (FPGA) bit-stream. The host code for the JSON parser 110 may be compiled with dpcpp 2022.1. For the measurements of the central processing unit (CPU) based parsers, a container with Docker version 20.10.12 is set up and compiled the parsers with gcc 9.1.0.

The evaluation may include the same central processing unit (CPU) based JSON parsers shown in Table 1 and the datasets shown in Table 2 below (e.g., GS to GE in Table 2) with the addition of synthetic documents generated to explore effects of document structure on performance. Examples of documents include DEEP_OBJECTS containing nested JSON objects with depth 16 and BIG_ARRAYS containing nested arrays with multiple entries. The documents INTS_n, FLOATING POINT NUMBERS_n, STRS_n are fixed at m=8M, but may vary by the number of digits n of integers and floating point numbers, respectively, and string length n. Table 2 shows the documents used in the evaluation, their abbreviation used in plots, and their properties.

TABLE 2

| Name | #Ints | #Floats | #Strs. | #Objs. | #Arrs. | Size |
|---|---|---|---|---|---|---|
| gsoc-2018 (gs) | 0 | 0 | 34128 | 3793 | 0 | 3.33 MB |
| marine_ik (ma) | 130225 | 114950 | 38268 | 9680 | 28377 | 2.98 MB |
| canada (cd) | 46 | 111080 | 12 | 4 | 56045 | 2.25 MB |
| citm_catalog (ci) | 14392 | 0 | 26604 | 10937 | 10451 | 1.73 MB |
| mesh.pretty (mp) | 40613 | 32400 | 11 | 3 | 3610 | 1.58 MB |
| mesh (me) | 40613 | 32400 | 11 | 3 | 3610 | 0.72 MB |
| twitter (tw) | 2108 | 1 | 18099 | 1264 | 1050 | 0.63 MB |
| twitter-escaped (te) | 2108 | 1 | 18099 | 1264 | 1050 | 0.56 MB |
| update-center (uc) | 0 | 0 | 27229 | 1896 | 1937 | 0.53 MB |
| random (rd) | 5002 | 0 | 33005 | 4001 | 1001 | 0.51 MB |
| instruments (in) | 4935 | 0 | 6889 | 1012 | 194 | 0.22 MB |
| numbers (nb) | 0 | 10001 | 0 | 0 | 1 | 0.15 MB |
| apache_builds (ab) | 0 | 5289 | 26 | 884 | 3 | 0.13 MB |
| github_events (ge) | 149 | 0 | 1891 | 180 | 19 | 0.07 MB |
| deep_objects (do) | 261121 | 0 | 391426 | 261121 | 130306 | 4.67 MB |
| big_arrays (ba) | 238400 | 0 | 301600 | 134400 | 15201 | 4.27 MB |
| ints_n | m/(n + 2) | 0 | 0 | 0 | 1 | mB |
| floats_n | 0 | m/(n + 3) | 0 | 0 | 1 | mB |
| strs_n | 0 | 0 | m/(n + 4) | 0 | 1 | mB |

Strs.: Strings; Objs.: Objects; Arrs.: Arrays

The maximum theoretical performance for the throughput $T_{max}$ of the JSON parser 110, as determined by Equation (1) below, is considered.

$$T_{max} = \min\left(\frac{CL_{size}}{II} \cdot f, DTR\right) \quad (1)$$

with JSON documents of size larger than cache line size $CL_{size}$, pipeline initialization interval II (e.g., input rate of pipeline in cycles), achieved clock frequency of the design $f$, and data transfer rate from buffer location to field programmable gate array (FPGA) (e.g., PCIe or FPGA memory) DTR. Overall, the JSON parser 110 achieves an II of 1, which is the smallest possible value. This means that a new input can be passed to all pipelines in each clock cycle. Additionally, cache line size $CL_{size}$ may be fixed at 64 bytes, which is the interface width for a peripheral component interconnect express (PCIe) bus or a single channel of Double Data Rate 4 (DDR4) synchronous dynamic random access memory (SDRAM).

Table 3 below depicts two different configurations of the JSON parser 110 with their respective resource utilization, clock frequency $f$, and resulting maximum theoretical performance $T_{max}$. Even though the peripheral component interconnect express (PCIe) v3 x16 of the benchmark system has a theoretical bandwidth limit of 16 gigabytes per second, a maximum throughput of 13 gigabytes per second is measured with Intel oneAPI. Thus, that throughput is used as the DTR for the peripheral component interconnect express (PCIe) implementation of the JSON parser 110, which in turn limits the maximum theoretical performance $T_{max}$, making the peripheral component interconnect express (PCIe) implementation of the JSON parser 110 I/O-bound. Meanwhile, the device-to-device (D2D) implementation of the JSON parser 110 has a maximum theoretical performance T max of 19.33 gigabytes per second and is compute-bound instead. Higher performance may be achieved by either increasing the number of interface channels (i.e., data parallelism), or clock frequency up to a theoretical maximum of 400 megahertz for the oneAPI setup on Stratix 10.

TABLE 3

| Configuration | LUTs | Regs. | BRAM | DSPs | f | $T_{max}$ |
|---|---|---|---|---|---|---|
| PipeJSON (PCIe) | 72.2% | 34.6% | 8.1% | 8.6% | 242 MHz | 13.00 GB/s |
| PipeJSON (D2D) | 71.1% | 34.8% | 7.9% | 8.9% | 302 MHz | 19.33 GB/s |

LUTs: Look-up-tables; Regs.: Registers

Figure 9:
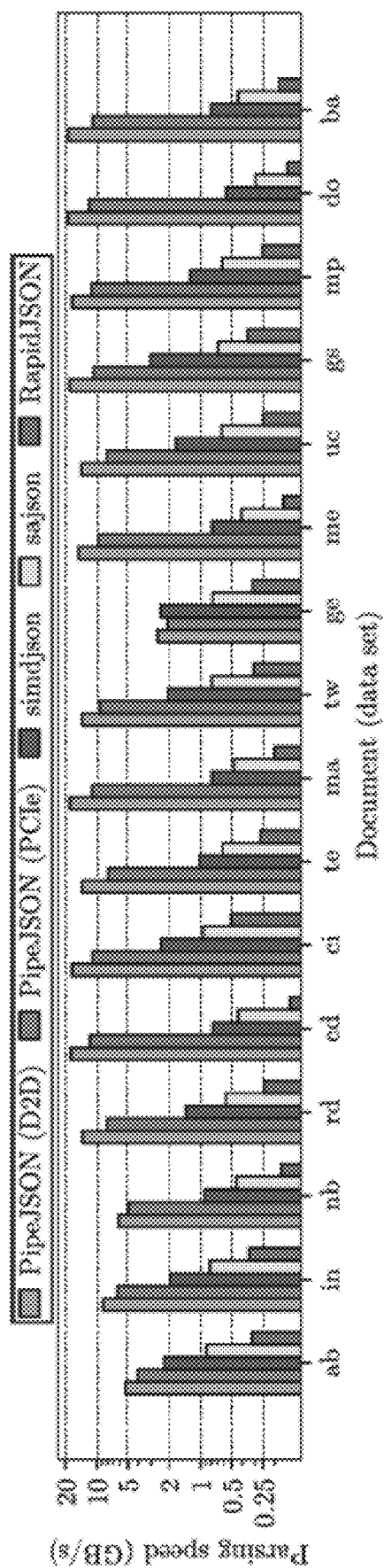
FIG. 9 depicts a performance comparison between a field programmable gate array (FPGA) JavaScript Object Notation (JSON) parser and various central processing unit (CPU) parsers, in accordance with some example embodiments.

In a first experiment, shown in FIG. 9, the JSON parser 110 is compared to the state-of-the-art central processing unit (CPU) based parsers simdjson, sajson, and RapidJSON (shown in Table 1) on all data sets from Table 2 (e.g., GS to GE), deep_objects (DO), and big_arrays (BA). The results show that while sajson performs better than the frequently used RapidJSON, the data parallel implementation of simdjson is even faster. Overall, the JSON parser 110 outperforms the central processing unit (CPU) parsers with a parsing speed of up to 11.94 gigabytes per second for the peripheral component interconnect express (PCIe) attached variant and 18.82 gigabyte for the device-to-device (D2D), on-board variant. The biggest improvements over central processing unit (CPU) parsers are observed for the marine_ik (MA), deep_objects (DO), and big_arrays (BA) documents, which are the documents with the by far highest number of integers and floating point numbers (e.g., numbers).

Figure 10:
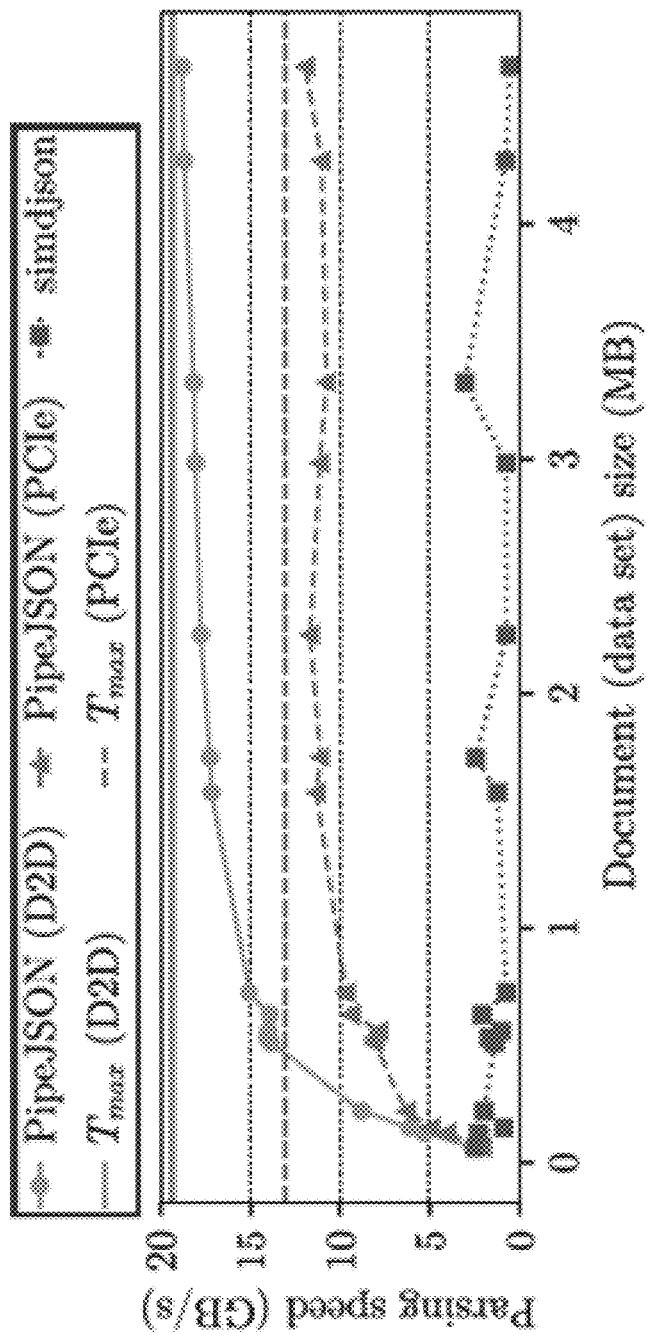
FIG. 10 depicts a comparison of parsing speed between a field programmable gate array (FPGA) JavaScript Object Notation (JSON) parser and various central processing unit (CPU) parser, in accordance with some example embodiments.

To gain a better insight into the correlation between document size and performance, the documents are sorted in an ascending order by size (e.g., in megabytes) in FIG. 10 before comparing the performance of the peripheral component interconnect express (PCIe) attached and device-to-device (D2D) variants of the JSON parser 110 to the fastest central processing unit (CPU) parser (e.g., simdjson). The theoretical performance limits from Table 3 are shown horizontal lines in order to depict the magnitude of deviation exhibited by the two variants of the JSON parser 110. FIG. 10 shows that the performance of both configurations of the JSON parser 110 logarithmically approaches the theoretical performance limit with document size but this performance may degrade for documents below 0.5 megabytes in size. This stems from an estimated latency, introduced by oneAPI, of calling the JSON parser 110 of 25.29 μs for the device-device (D2D) variant and 28.47 μs for the peripheral component interconnect express (PCIe) variant and an estimated pipeline depth of 900. Regarding pipeline depth, this means that the JSON parser 110 does not operate at peak parallelism for the first and last 900 64B blocks of input data.

Figure 11:
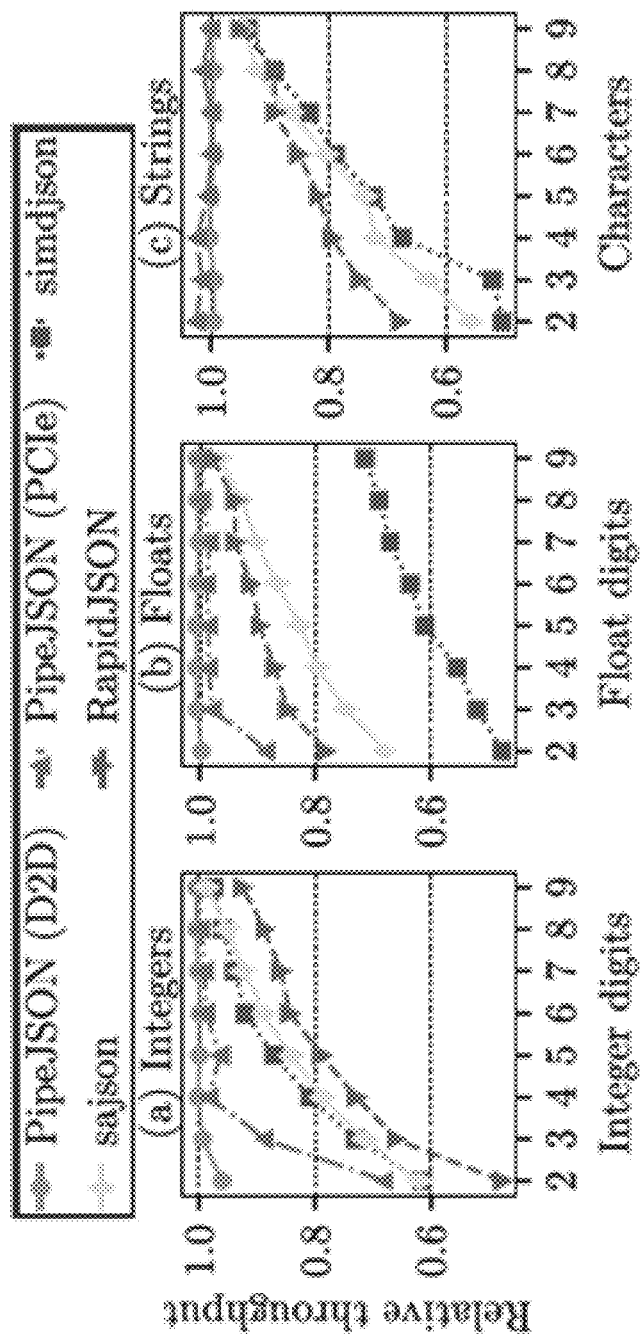
FIG. 11 depicts a comparison of throughput a field programmable gate array (FPGA) JavaScript Object Notation (JSON) parser and various central processing unit (CPU) parsers, in accordance with some example embodiments.

A second experiment is conducted to further explore the relatively low central processing unit (CPU) parser performance shown in FIG. 9 for MA, DO, and BA documents. Therefore, the slowdown observed for all parsers for increasingly smaller elements of integers, floating point numbers, and strings are plotted in FIG. 11. Performance on the synthetic documents INTS_n, FLOATING POINT NUMBERS_n, and STRS_n are measured for two to ten digits—due to experiments with 32 bit integers—and the measurements are then normalized to the ten digit measurement of its respective parser. For the JSON parser 110, the results suggest a robustness regarding element sizes, while the central processing unit (CPU) parsers are vulnerable for smaller element sizes of integers, floating point numbers, and strings. Notably, simdjson is slightly better for integers, but slower for float and character parsing. The device-to-device (D2D) variant of the JSON parser 110 is robust in performance, even for very small integers, while the peripheral component interconnect express (PCIe) attached variant of the JSON parser 110 slows down slightly for smaller integers and floating point numbers. For this particular combination, the JSON parser 110 may be required to write back more data to the memory 115 than is read from the input string 303 in the first place, degrading performance with the limited peripheral component interconnect express (PCIe) bandwidth.

In summary, the results from the experiments on common JSON data sets show that the JSON parser 110 achieves superior results for data parallel parsing compared to conventional central processing unit (CPU) based approaches. In particular, the device-to-device (D2D) implementation of the JSON parser 110 achieved an average speedup of 12.56× over the fastest data-parallel central processing unit (CPU) based parser simdjson, with a maximum speedup of 33.37×. For the peripheral component interconnect express (PCIe) attached variant of the JSON parser 110, the average speedup over simdjson is 7.95× while the maximum speedup is 21.17×. The JSON parser 110 may perform exceptionally well for increasing document sizes, the improvement being I/O-bound for the peripheral component interconnect express (PCIe) variant and compute-bound for the device-to-device (D2D) variant. These bottlenecks may be circumvented through an increased frequency or instance parallelization of the JSON parser 110 on the field programmable gate array (FPGA). The JSON parser 110 is also more robust when handling digit scaling of integers, floating point numbers, and strings when compared to central processing unit (CPU) parsers, especially when compared to simdjson on floating point numbers and strings.

Figure 13:
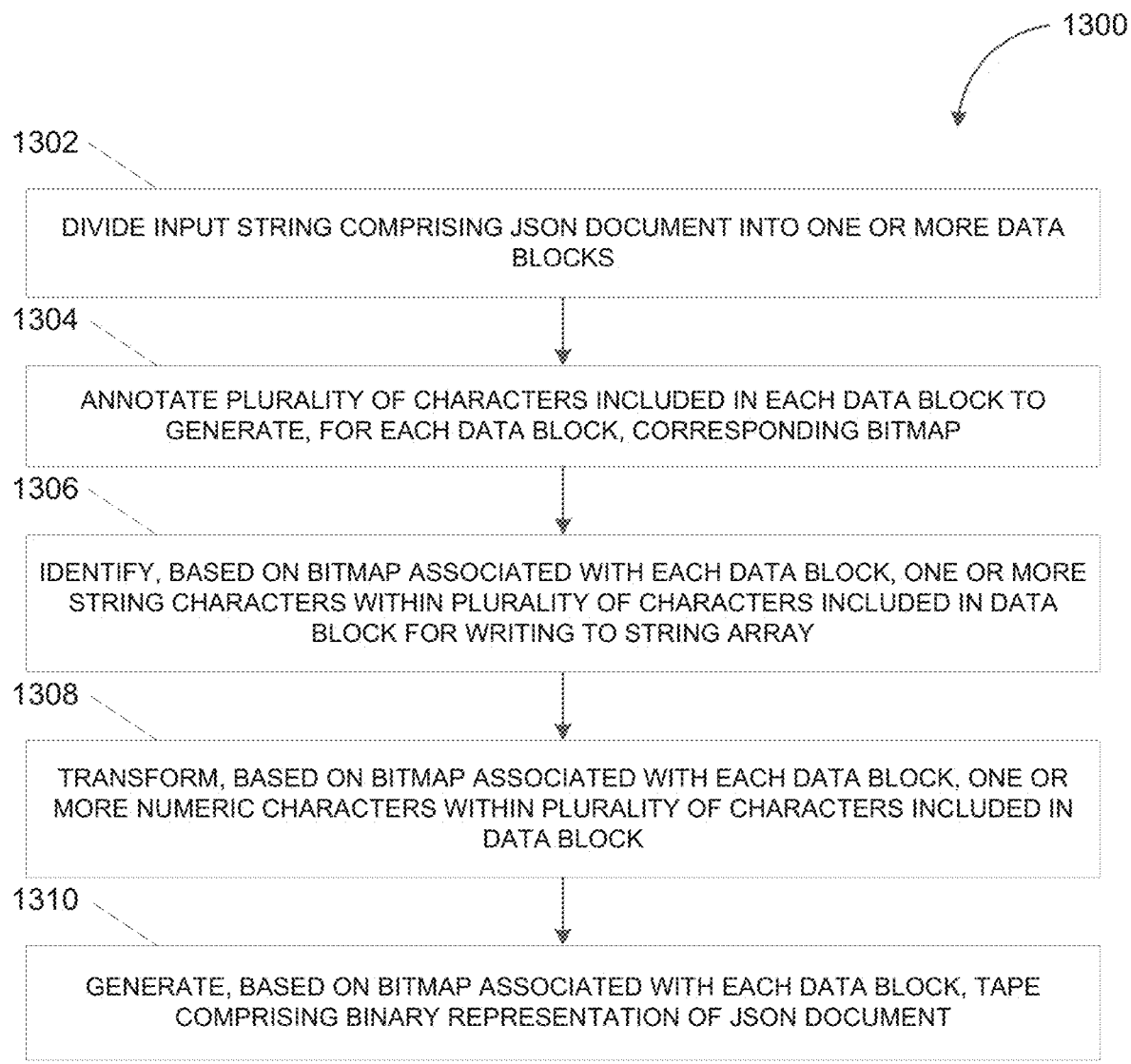
FIG. 13 depicts a flowchart illustrating an example of a process for parsing a JavaScript Object Notation (JSON) document, in accordance with some example embodiments.

FIG. 13 depicts a flowchart illustrating an example of a process 1300 for parsing a JSON document, in accordance with some example embodiments. Referring to FIGS. 1-12, the process 1300 may be performed by the JSON parser 110, which may be implemented on a field programmable gate array (FPGA) to achieve optimal parsing performance through the flexible pipelining and data parallelism afforded by the field programmable gate array (FPGA). The JSON parser 110 may parse, for example, the JSON document 135 for ingestion and processing by the one or more applications 125. For example, the JSON parser 110 may parse the JSON document 135 by at least from a raw string into a binary representation capable of being ingested and processed by the one or more applications 125.

At 1302, the JSON parser 110 may divide, into one or more data blocks, an input string comprising a JavaScript Objet Notation (JSON) document. In some example embodiments, the input reader 302 of the JSON parser 110 may read the input string 303 corresponding to the JSON document 135 and divide the input string 303 into one or more data blocks. The one or more data blocks may have a fixed size matching the cache line width of the memory channel found in the dynamic random access memory (DRAM) associated with the field programmable gate array (FPGA) implementing the JSON parser 110. For example, in some cases, the input reader 302 may split the input string 303 into 64 character large blocks in order to match the cache line width of a 64-byte single memory channel found in current dynamic random access memory (DRAM) technology. The input reader 302 may then pass each data block to the tokenizer 304 and a queue, such as a first-in-first-out (FIFO) queue for on-chip memory and logic, for additional processing.

At 1304, the JSON parser 110 may annotate a plurality of characters included in each data block to generate, for each data block, a corresponding bitmap. In some example embodiments, the tokenizer 304 of the JSON parser 110 may annotate the characters in each data block with bitmaps that are then passed to datatype-specific components of the JSON parser 110 such as the number parser 306 and the string filter 308. FIG. 4(*a*) depicts examples of bitmaps generated by the tokenizer 304 which may include, for example, I denoting the input string 303, Q denoting the quotes, OD denoting the ends of odd sequences of backslashes, TI denoting the tokens, NR denoting the number characters, and DP denoting the decimal points included in the input string 303.

At 1306, the JSON parser 110 may identify, based at least on the bitmap associated with each data block, one or more string characters within the plurality of characters included in each data block. In some example embodiments, the string filter 308 of the JSON parser 110 may, based on the bitmap associated with each data block, select and write all string characters in the data blocks to the string array 305 in the memory 115. The string filter 308 may further pass the quantity of strings in each data block and the lengths of the individual strings to the tape builder 310.

At 1308, the JSON parser 110 may transform, based at least on the bitmap associated with each data block, one or more numeric characters within the plurality characters included in each data block. In some example embodiments, the number parser 306 of the JSON parser 110 may transform, based at least on the bitmap associated with each data block, the numeric characters in the data blocks into either integer values or float values. The number parser 306 may then write integer values to the integer array 309 in the memory 115 and float values to the float array 311 in the memory 115.

At 1310, the JSON parser 110 may generate, based at least on the bitmap associated with each data block, a tape comprising a binary representation of the JSON document.

In some example embodiments, the tape builder 310 of the JSON parser 110 may read the input characters, bitmaps, and information from the number parser 306 and the string filter 308, and write one or more tokens corresponding to the binary representation of the JSON document 135 to the tape 307 in memory 115. The binary representation of the JSON document 135 may be ingested for processing, for example, by the one or more applications 125 at the application server 120. In some cases, the binary representation of the JSON document 135 written to the tape 307 may include a sequence of one-byte tokens corresponding to the strings, integers, boolean, null (not shown), and float point numbers present in the JSON document 135. Furthermore, the binary representation of the JSON document 135 written to the tape 307 may include nested objects and array structures denoted by a begin token and an end token. A certain quantity (e.g., six or a different number) of the least significant bits of a string token may be used to store the length of the string. Long and overflowing strings may be stored as a series of string tokens, each with a maximum length (e.g., 64 bits and/or the like), and a delimiting string end token. The characters of the string itself are stored in the string array 305 but tokens for commas and colons may be omitted because they can be derived from the context of being in an object or array.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: a JavaScript Object Notation (JSON) parser implemented on a field programmable gate array (FPGA), the JSON parser configured to perform operations comprising: dividing, by an input reader of the JSON parser, an input string comprising a JSON document into one or more data blocks; annotating, by a tokenizer of the JSON parser, a plurality of characters included in each data block of the one or more data blocks to generate, for each data block of the one or more data blocks, a corresponding bitmap; identifying, by a string filter of the JSON parser and based on the bitmap associated with each data block of the one or more data blocks, one or more string characters within the plurality of characters included in the data block for writing to a string array; transforming, by a number parser of the JSON parser and based on the bitmap associated with each data block of the one or more data blocks, one or more numeric characters within the plurality of characters included in the data block, the one or more numeric characters being transformed into an integer value for writing to an integer array or a float value for writing to a float array; and generating, by a tape builder of the JSON parser and based on the bitmap associated with each data block of the one or more data blocks, a tape comprising a binary representation of the JSON document.

Example 2: The system of Example 1, wherein each of the input reader, the tokenizer, the string filter, the number parser, and the tape builder form a pipeline on the field programmable gate array (FPGA).

Example 3: The system of any of Examples 1 to 2, wherein the JSON parser is communicatively coupled, via a peripheral component interconnect express (PCIe), with a parser stub on a host central processing unit (CPU) with host code for one or more applications ingesting the binary representation of the JSON document.

Example 4: The system of any of Examples 1 to 3, wherein the JSON parser is deployed on a first device while one or more applications ingesting the binary representation of the JSON document is hosted on a second device.

Example 5: The system of any of Examples 1 to 4, wherein the tokenizer is further configured to append a first bit to an end of a first bitmap of a first data block and a last bit of the first bitmap and a second bit to a start of a second bitmap of a second data block following the first block, and wherein the first bit and the second bit identifies an overflow type associated with a single JSON value spanning the first data block and the second data block.

Example 6: The system of Example 5, wherein the overflow type comprises a string, a backslash, a number, or none.

Example 7: The system of any of Examples 5 to 6, wherein the tokenizer is configured to compute, for all overflow types, a corresponding bitmap in parallel, and wherein one or more bitmaps passed onto the string filter and/or the number parser are identified by a multiplexer based on a known overflow type from a previous data block.

Example 8: The system of any of Examples 1 to 7, wherein the string filter operates on a quoted range (QR) bitmap, and a quoted range end (QRE) bitmap, and a corresponding block of characters.

Example 9: The system of any of Examples 1 to 8, wherein the string filter is configured to compact one or more string characters within a data block into a single contiguous sequence while tracking a quantity of characters, a quantity of different strings, and a length of each individual string.

Example 10: The system of any of Examples 1 to 9, wherein the number parser operates on a number range (NR) bitmap, a number range end (NRE) bitmap, a floating point decimal part (FDP) bitmap, and a corresponding block of characters.

Example 11: The system of any of Examples 1 to 10, wherein the number parser is configured to process one input character in each pipeline step while updating an internal counter tracking a current number being parsed.

Example 12: The system of Example 11, wherein a temporary number pointed to by the internal counter is multiplied by 10 and added to the current number when the number parser encounters a numerical character, wherein the number parsers passes on the temporary number when the number parser fails to encounter a numerical character, wherein the internal counter is incremented when the number parser encounters a number range end indicating that the current number is finished parsing, and wherein an auxiliary decimal digit counter is incremented when the number parser encounters a decimal point.

Example 13: The system of any of Examples 1 to 12, wherein the binary representation of the JSON document includes a plurality of one-byte tokens corresponding to strings, integers, Booleans, null, and/or floating point numbers.

Example 14: The system of any of Examples 1 to 13, wherein the binary representation of the JSON document includes one or more nested objects and array structures, and wherein each nested object or array structure is denoted by a begin token and an end token.

Example 15: A computer-implemented method, comprising: dividing, by an input reader of a JavaScript Object Notation (JSON) parser implemented on a field programmable gate array (FPGA), an input string comprising a JSON document into one or more data blocks; annotating, by a tokenizer of the JSON parser, a plurality of characters included in each data block of the one or more data blocks to generate, for each data block of the one or more data blocks, a corresponding bitmap; identifying, by a string filter of the JSON parser and based on the bitmap associated with each data block of the one or more data blocks, one or more string characters within the plurality of characters included in the data block for writing to a string array; transforming, by a number parser of the JSON parser and based on the bitmap associated with each data block of the one or more data blocks, one or more numeric characters within the plurality of characters included in the data block, the one or more numeric characters being transformed into an integer value for writing to an integer array or a float value for writing to a float array; and generating, by a tape builder of the JSON parser and based on the bitmap associated with each data block of the one or more data blocks, a tape comprising a binary representation of the JSON document.

Example 16: The method of Example 15, wherein each of the input reader, the tokenizer, the string filter, the number parser, and the tape builder form a pipeline on the field programmable gate array (FPGA).

Example 17: The method of any of Examples 15 to 16, wherein the tokenizer is further configured to append a first bit to an end of a first bitmap of a first data block and a last bit of the first bitmap and a second bit to a start of a second bitmap of a second data block following the first block, and wherein the first bit and the second bit identifies an overflow type associated with a single JSON value spanning the first data block and the second data block.

Example 18: The method of any of Examples 15 to 17, wherein the string filter is configured to compact one or more string characters within a data block into a single contiguous sequence while tracking a quantity of characters, a quantity of different strings, and a length of each individual string, and wherein the number parser is configured to process one input character at a time while updating an internal counter tracking a current number being parsed.

Example 19: The method of Example 18, wherein the overflow type comprises a string, a backslash, a number, or none.

Example 20: The method of any of Examples 18 to 19, wherein the tokenizer is configured to compute, for all overflow types, a corresponding bitmap in parallel, and wherein one or more bitmaps passed onto the string filter and/or the number parser are identified by a multiplexer based on a known overflow type from a previous data block.

Figure 14:
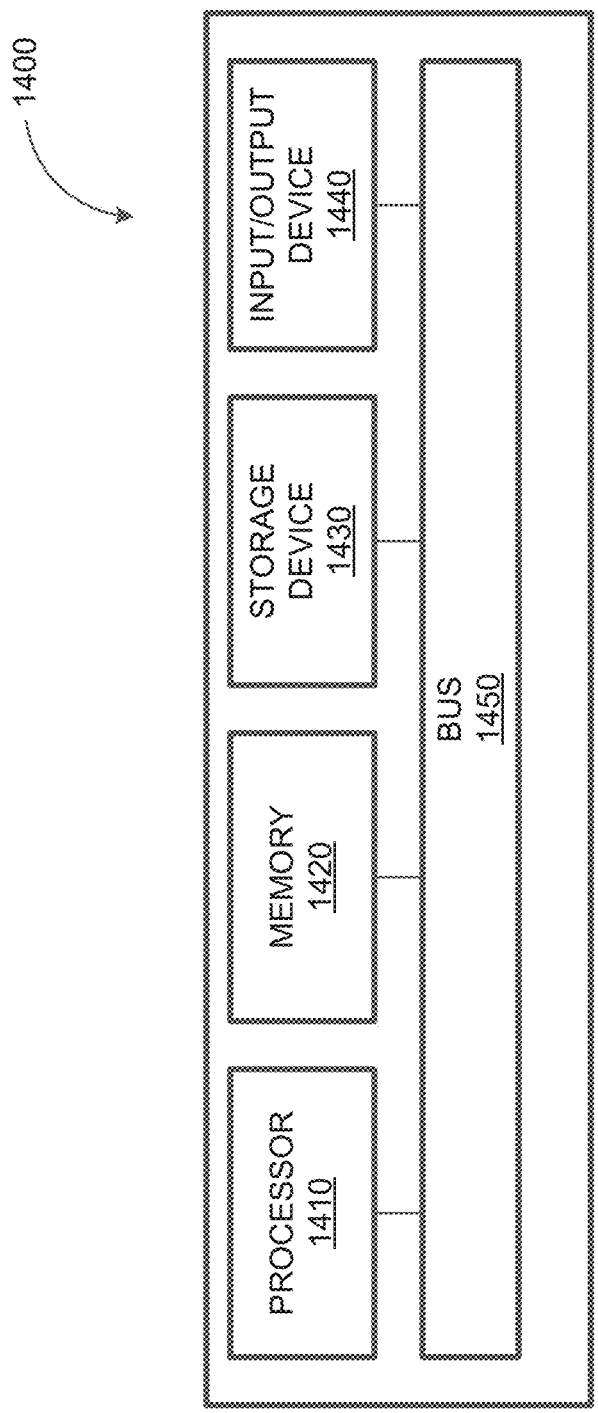
FIG. 14 depicts a block diagram illustrating an example of a computing system, in accordance with some example embodiments.

FIG. 14 depicts a block diagram illustrating an example of a computing system 1400 consistent with implementations of the current subject matter. Referring to FIGS. 1-14, the computing system 1400 may implement the JSON parser 110 and/or any components therein.

As shown in FIG. 14, the computing system 1400 can include a processor 1410, a memory 1420, a storage device 1430, and input/output device 1440. The processor 1410, the memory 1420, the storage device 1430, and the input/output device 1440 can be interconnected via a system bus 1450. The processor 1410 is capable of processing instructions for execution within the computing system 1400. Such executed instructions can implement one or more components of, for example, the JSON parser 110. In some implementations of the current subject matter, the processor 1410 can be a single-threaded processor. Alternately, the processor 1410 can be a multi-threaded processor. The processor 1410 is capable of processing instructions stored in the memory 1420 and/or on the storage device 1430 to display graphical information for a user interface provided via the input/output device 1440.

The memory 1420 is a computer readable medium such as volatile or non-volatile that stores information within the computing system 1400. The memory 1420 can store data structures representing configuration object databases, for example. The storage device 1430 is capable of providing persistent storage for the computing system 1400. The storage device 1430 can be a floppy disk device, a hard disk device, an optical disk device, or a tape device, or other suitable persistent storage means. The input/output device 1440 provides input/output operations for the computing system 1400. In some implementations of the current subject matter, the input/output device 1440 includes a keyboard and/or pointing device. In various implementations, the input/output device 1440 includes a display unit for displaying graphical user interfaces.

According to some implementations of the current subject matter, the input/output device 1440 can provide input/output operations for a network device. For example, the input/output device 1440 can include Ethernet ports or other networking ports to communicate with one or more wired and/or wireless networks (e.g., a local area network (LAN), a wide area network (WAN), the Internet).

In some implementations of the current subject matter, the computing system 1400 can be used to execute various interactive computer software applications that can be used for organization, analysis and/or storage of data in various (e.g., tabular) format (e.g., Microsoft Excel®, and/or any other type of software). Alternatively, the computing system 1400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1440. The user interface can be generated and presented to a user by the computing system 1400 (e.g., on a computer screen monitor, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
a JavaScript Object Notation (JSON) parser implemented on a field programmable gate array (FPGA), the JSON parser configured to perform operations comprising:
dividing, by an input reader of the JSON parser, an input string comprising a JSON document into one or more data blocks;
annotating, by a tokenizer of the JSON parser, a plurality of characters included in each data block of the one or more data blocks to generate, for each data block of the one or more data blocks, a corresponding bitmap;
appending, by the tokenizer of the JSON parser, a first bit to an end of a first bitmap of a first data block, and pre-pending a last bit of the first bitmap and a second bit to a start of a second bitmap of a second data block following the first data block, wherein the first bit and the second bit identifies an overflow type associated with a single JSON value spanning the first data block and the second data block;
identifying, by a string filter of the JSON parser and based on a bitmap associated with each data block of the one or more data blocks, one or more string characters within the plurality of characters included in the data block for writing to a string array;
transforming, by a number parser of the JSON parser and based on the bitmap associated with each data block of the one or more data blocks, one or more numeric characters within the plurality of characters included in the data block, the one or more numeric characters being transformed into an integer value for writing to an integer array or a float value for writing to a float array; and
generating, by a tape builder of the JSON parser and based on the bitmap associated with each data block of the one or more data blocks, a tape comprising a binary representation of the JSON document.

2. The system of claim 1, wherein each of the input reader, the tokenizer, the string filter, the number parser, and the tape builder form a pipeline on the FPGA.

3. The system of claim 1, wherein the JSON parser is communicatively coupled, via a peripheral component interconnect express (PCIe), with a parser stub on a host central processing unit (CPU) with host code for one or more applications ingesting the binary representation of the JSON document.

4. The system of claim 1, wherein the JSON parser is deployed on a first device while one or more applications ingesting the binary representation of the JSON document is hosted on a second device.

5. The system of claim 1, wherein the second bit is an overflow bit from an end of the first data block.

6. The system of claim 1, wherein the overflow type comprises a string, a backslash, a number, or none.

7. The system of claim 1, wherein the operations further comprise computing, by the tokenizer of the JSON parser, for all overflow types, a corresponding bitmap in parallel, and wherein one or more bitmaps passed onto the string filter and/or the number parser are identified by a multiplexer based on a known overflow type from a previous data block.

8. The system of claim 1, wherein the operations further comprise operating, by the string filter of the JSON parser, on a quoted range (QR) bitmap, and a quoted range end (QRE) bitmap, and a corresponding block of characters.

9. The system of claim 1, wherein the operations further comprise compacting, by the string filter of the JSON parser, one or more string characters within a data block into a single contiguous sequence while tracking a quantity of characters, a quantity of different strings, and a length of each individual string.

10. The system of claim 1, wherein the operations further comprise operating, by the number parser of the JSON parser, on a number range (NR) bitmap, a number range end (NRE) bitmap, a floating point decimal part (FDP) bitmap, and a corresponding block of characters.

11. The system of claim 1, wherein the operations further comprise processing, by the number parser of the JSON parser, one input character in each pipeline step while updating an internal counter tracking a current number being parsed.

12. The system of claim 11, wherein the operations further comprise multiplying, by the number parser of the JSON parser, a temporary number pointed to by the internal counter by ten and adding to the current number when the number parser encounters a numerical character.

13. The system of claim 1, wherein the binary representation of the JSON document includes a plurality of one-byte tokens corresponding to strings, integers, Booleans, null, and/or floating point numbers.

14. The system of claim 1, wherein the binary representation of the JSON document includes one or more nested objects and array structures, and wherein each nested object or array structure is denoted by a begin token and an end token.

15. A computer-implemented method, comprising:
- dividing, by an input reader of a JavaScript Object Notation (JSON) parser implemented on a field programmable gate array (FPGA), an input string comprising a JSON document into one or more data blocks;
- annotating, by a tokenizer of the JSON parser, a plurality of characters included in each data block of the one or more data blocks to generate, for each data block of the one or more data blocks, a corresponding bitmap;
- appending, by the tokenizer of the JSON parser, a first bit to an end of a first bitmap of a first data block, and pre-pending a last bit of the first bitmap and a second bit to a start of a second bitmap of a second data block following the first data block, wherein the first bit and the second bit identifies an overflow type associated with a single JSON value spanning the first data block and the second data block;
- identifying, by a string filter of the JSON parser and based on a bitmap associated with each data block of the one or more data blocks, one or more string characters within the plurality of characters included in the data block for writing to a string array;
- transforming, by a number parser of the JSON parser and based on the bitmap associated with each data block of the one or more data blocks, one or more numeric characters within the plurality of characters included in the data block, the one or more numeric characters being transformed into an integer value for writing to an integer array or a float value for writing to a float array; and
- generating, by a tape builder of the JSON parser and based on the bitmap associated with each data block of the one or more data blocks, a tape comprising a binary representation of the JSON document.

16. The method of claim 15, wherein each of the input reader, the tokenizer, the string filter, the number parser, and the tape builder form a pipeline on the FPGA.

17. The method of claim 15, wherein the second bit an overflow bit from an end of the first data block.

18. The method of claim 15, further comprising compacting, by the string filter of the JSON parser, one or more string characters within a data block into a single contiguous sequence while tracking a quantity of characters, a quantity of different strings, and a length of each individual string, and wherein the number parser is configured to process one input character at a time while updating an internal counter tracking a current number being parsed.

19. The method of claim 18, wherein the overflow type comprises a string, a backslash, a number, or none.

20. The method of claim 18, further comprising computing, by the tokenizer of the JSON parser, for all overflow types, a corresponding bitmap in parallel, and wherein one or more bitmaps passed onto the string filter and/or the number parser are identified by a multiplexer based on a known overflow type from a previous data block.

* * * * *